US004001572B2

United States Statutory Invention Registration [19]

[11] Reg. Number: H1572

Hood

[45] Published: Aug. 6, 1996

[54] WAVELENGTH STABILIZING LASER MIRROR

[75] Inventor: Patrick J. Hood, Beavercreek, Ohio

[73] Assignee: The United States of America as represented by the Secretary of the Air Force, Washington, D.C.

[21] Appl. No.: 367,633

[22] Filed: Jan. 3, 1995

[51] Int. Cl.[6] ..... G02B 5/08; G02B 5/20; F21V 9/00

[52] U.S. Cl. ..... 359/359; 359/580; 359/584; 359/586; 359/589

[58] Field of Search ..... 359/359, 580, 359/584, 586, 589

[56] References Cited

U.S. PATENT DOCUMENTS

| | | | |
|---|---|---|---|
| 4,826,267 | 5/1989 | Hall et al. | 359/586 |
| 4,915,476 | 4/1990 | Hall et al. . | |
| 4,925,259 | 5/1990 | Emmett | 359/589 |
| 4,952,025 | 8/1990 | Gunning, III | 359/586 |
| 5,000,575 | 3/1991 | Southwell et al. | 356/382 |
| 5,009,485 | 4/1991 | Hall | 359/586 |
| 5,056,099 | 10/1991 | Bradley | 359/580 |
| 5,181,143 | 1/1993 | Southwell | 359/589 |
| 5,258,872 | 11/1993 | Johnson et al. | 359/580 |
| 5,291,332 | 3/1994 | Siebert | 359/586 |

*Primary Examiner*—Bernarr E. Gregory
*Attorney, Agent, or Firm*—Bobby D. Scearce; Thomas L. Kundert

[57] ABSTRACT

A high performance wavelength stabilizing laser mirror/output coupler, particularly useful for stabilizing a laser cavity within a narrow bandwidth, is described, which comprises a substrate of selected material on which is deposited an optical coating having a refractive index profile over the thickness thereof which is selectively continuously modulated between preselected high and low values to define a preselected narrow reflectance spectrum.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WAVELENGTH STABILIZING LASER MIRROR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical elements for laser systems, and more particularly to a high performance wavelength stabilizing laser mirror having utility in stabilizing a laser cavity within a narrow bandwidth.

Certain laser types are capable of operating over a broad wavelength band. For example, carbon dioxide ($CO_2$) lasers are capable of lasing at several discrete wavelengths between 9.2 and 11.2 microns, but are usually configured to operate at 10.6 microns. Some $CO_2$ lasers, such as RF-waveguide lasers with short cavities, modulate between wavelengths, which results in undesirable frequency and power modulations. In high power $CO_2$ laser applications, gratings may not be suitable for wavelength stabilization because of a susceptibility of the grating to damage. Alexandrite lasers are capable of operating efficiently at various wavelengths between 700 and 800 nm at temperatures to about 80° C. A standard fixed wavelength laser cavity (without a tuning element) having a broad-band rear cavity mirror will typically shift in wavelength of operation as the laser warms up. If the wavelength shifts to 769 nm, certain optical elements used in the cavities (such as folding prisms, polarizers and waveplates) may be damaged because of optical absorption in oxide glasses at 769 nm. Conventional narrow-band laser mirrors are generally fabricated using dielectric stack and/or metal coating technology, and have an unacceptably wide bandwidth (typically 10% or more) relative to the tuning range of both the $CO_2$ and Alexandrite lasers.

The invention solves or substantially reduces in critical importance problems with prior art laser mirrors as just suggested by providing a laser cavity mirror or output coupler for stabilizing a laser within a narrow wavelength band, and is fabricated as an optical interference device in which the index of refraction is selectively continuously modulated between high and low values rather than in discrete steps as in conventional devices comprising dielectric layers. A laser may therefore be wavelength stabilized without using additional wavelength stabilization optics, such as an etalon, tuning plates, prism or grating. The invention may be used in high power laser applications to avoid damage to optical elements, has greater efficiency than conventional grating devices, is relatively inexpensive and may be fabricated with greater than 99% reflectivity and very narrow bandwidths (about 1% of center wavelength), whereas typical master gratings used for tuning a $CO_2$ laser have grating efficiencies of 85 to 90%.

It is therefore a principal object of the invention to provide a wavelength stabilizing laser mirror or output coupler.

It is a further object of the invention to provide a laser mirror/laser output coupler for stabilizing a laser cavity within a narrow bandwidth.

It is yet another object of the invention to provide a low-cost, high-performance mirror/output coupler for stabilizing a laser cavity within a narrow bandwidth.

These and other objects of the invention will become apparent as a detailed description of representative embodiments proceeds.

SUMMARY OF THE INVENTION

In accordance with the foregoing principles and objects of the invention, a high performance wavelength stabilizing laser mirror/output coupler, particularly useful for stabilizing a laser cavity within a narrow bandwidth, is described, which comprises a substrate of selected material on which is deposited an optical coating having a refractive index profile over the thickness thereof which is selectively continuously modulated between preselected high and low values to define a preselected narrow reflectance spectrum.

BRIEF DESCRIPTION OF THE DRAWINGS

The invention will be more clearly understood from the following detailed description of representative embodiments thereof read in conjunction with the accompanying drawings wherein.

DETAILED DESCRIPTION

Figure 1:
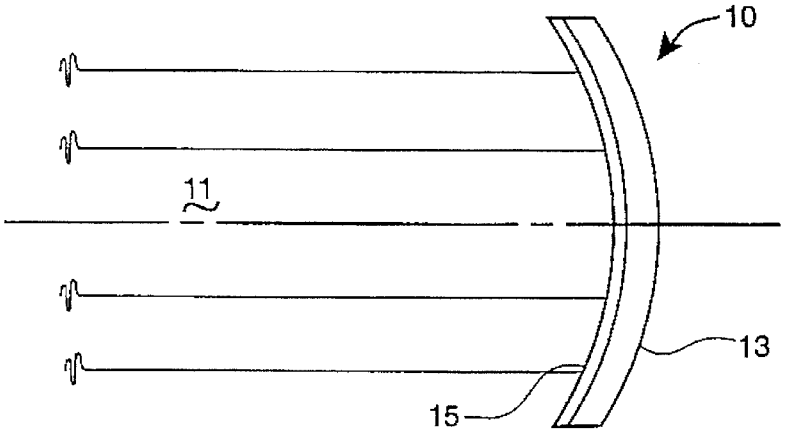
FIG. 1 is a view in axial section of a laser mirror/output coupler structure according to the teachings of the invention.

In accordance with a governing principle of the invention, a low-loss narrow-band reflector for use as a laser cavity mirror may be fabricated as an optical interference device in which the index of refraction is selectively continuously modulated between preselected high and low values. Referring now to FIG. 1, shown therein is a view in axial section of a representative embodiment of a laser mirror/output coupler device 10 configured according to the invention. Device 10 may be disposed to define one end of laser cavity 11. Although other specific structures within the scope of these teachings and of the appended claims may occur to the skilled artisan practicing the invention, the basic structure according to the invention may comprise substrate 13 of any suitable shape on which is deposited an optical coating in the form of film 15 described more fully below. Substrate 13 may comprise any suitable optical material as may be conventionally used for laser mirrors or output couplers, such as fused silica, silicon, zinc selenide or other suitable material as would occur to the skilled artisan.

Figure 2:
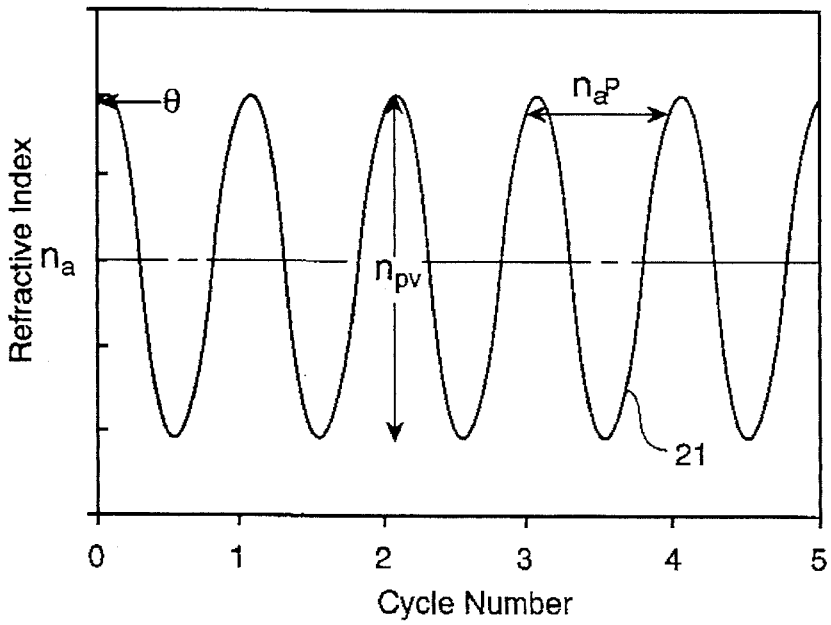
FIG. 2 is a graph of refractive index versus cycle number showing the parameters defining a simple continuous refractive index profile exemplary of the FIG. 1 structure.
Figure 3:
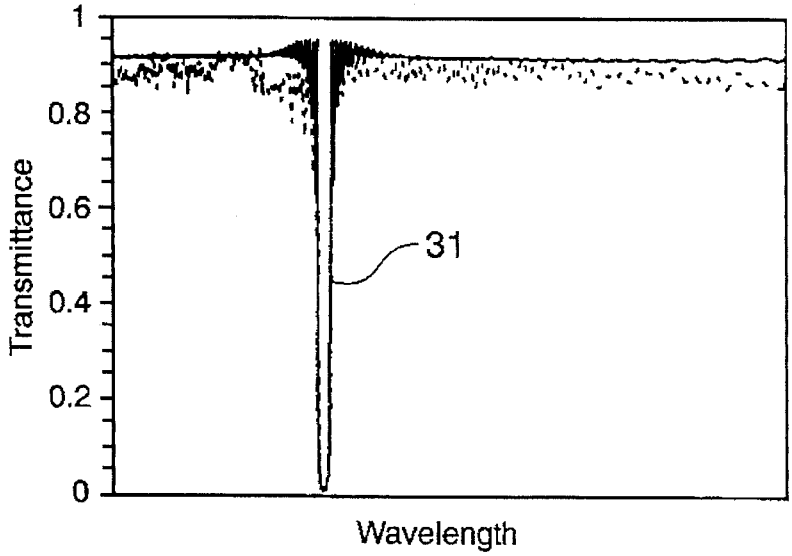
FIG. 3 is a graph of transmittance versus wavelength typical of the FIG. 2 structure.

In a device 10 structured according to the invention, film 15 comprises a suitable optical material deposited by any suitable means with preselected refractive index profile along the thickness thereof. Any suitable optical material may comprise film 15 including, for a laser mirror structure or for a laser output coupler structure, materials such as silicon dioxide ($SiO_2$), titanium dioxide ($TiO_2$), magnesium fluoride ($MgF_2$), thorium fluoride ($ThF_2$), zinc selenide (ZnSe), zinc sulfide (ZnS), or the like. Film 15 may be deposited by any suitable deposition process such as chemical vapor deposition, sputtering, thermal evaporation or electron beam deposition, in order to achieve the desired film structure as described herein. Referring now to FIG. 2, shown therein is a simple continuous (rugate type) refractive index profile 21 in the form of a sine wave which may characterize film 15 for a particular application. Refractive index profile 21 may be defined by five separate parameters noted on FIG. 2, including average refractive index ($n_a$), peak-to-valley refractive index excursion ($n_{pv}$), period of the sine wave in optical thickness ($n_aP$, where P is the period), phase θ at the substrate in radians, and number N of cycles. The wavelength at which the peak reflectance occurs is given by $2n_aP$. FIG. 3 shows a typical transmittance spectrum 31 for the FIG. 2 refractive index profile.

The optical thickness of film 15 for a device used as a wavelength stabilizing laser mirror according to the invention may be about 30 to 50 microns (μ), or about 50 to 250 cycles. An output coupler may be similarly fabricated but with fewer (50 to 100) cycles (optical thickness of about 20 to 50 μ) so that peak reflectivity is selectively lower than that of the mirror structure.

In the fabrication of a device according to the invention as just described, film 15 may be applied utilizing a mixture of two or more materials with mixed and/or periodic variations of θ, $n_a$, $n_{pv}$, $n_aP$, and N in any desired combination as would occur to the skilled artisan in order to achieve a desired wavelength reflectance spectrum and band width.

Figure 4A:
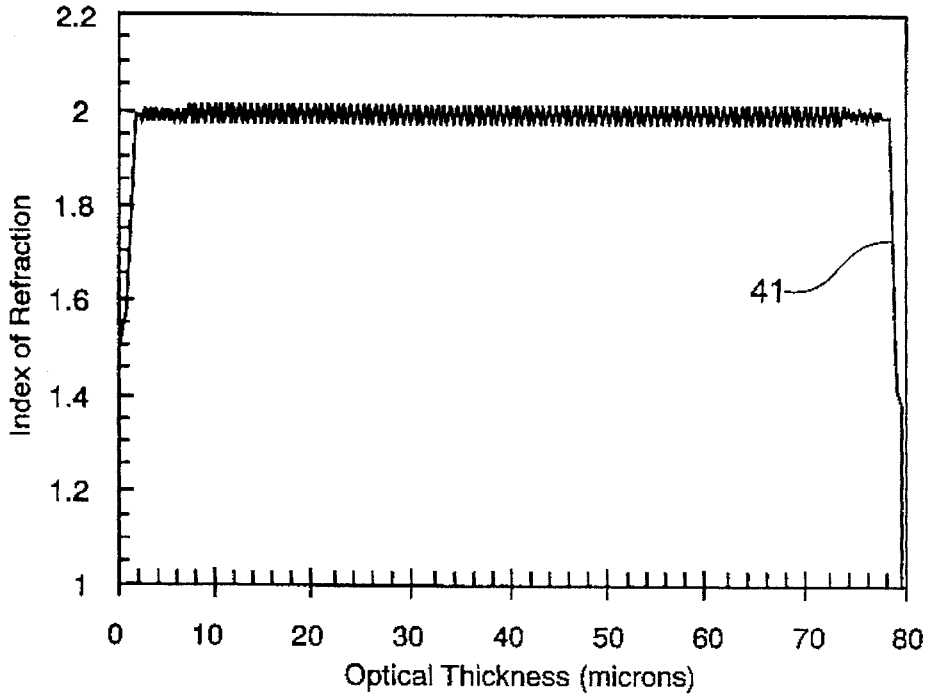
FIGS. 4*a* and 4*b* show, respectively, refractive index versus optical thickness and characteristic reflectance spectrum for a laser cavity reflector mirror structured according to the invention for stabilizing the output of an Alexandrite laser operating at 755 nm.
Figure 4B:
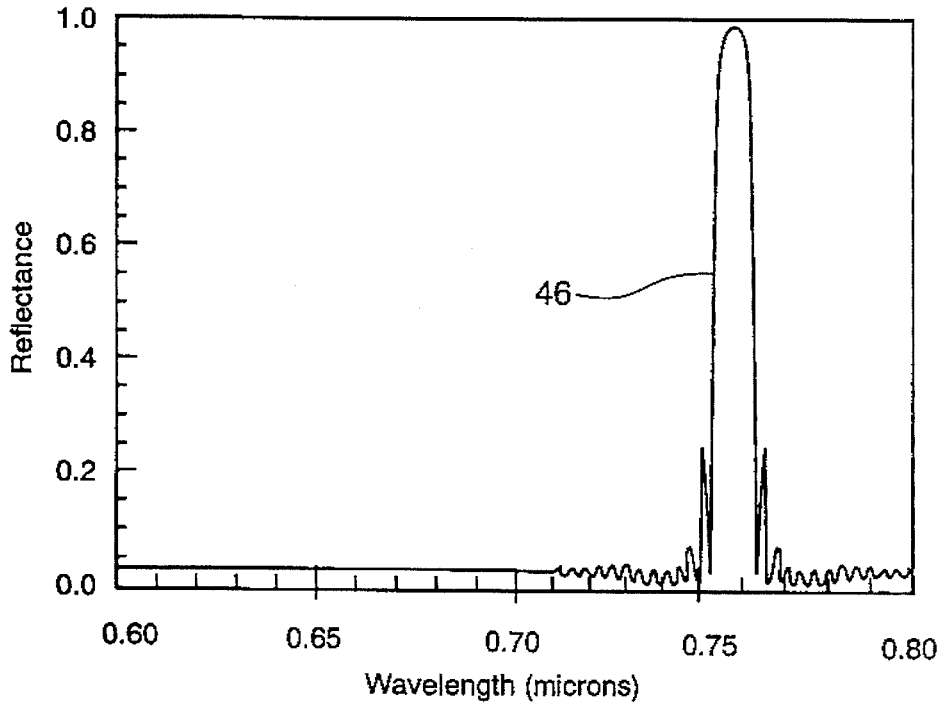

Referring now to FIGS. 4*a* and 4*b*, shown therein, respectively, are refractive index versus optical thickness profile 41 and characteristic reflectance spectrum 46 for a laser cavity reflector mirror structured according to the invention for stabilizing the output of an Alexandrite laser operating at 755 rim. The optical coating (film 15) for the mirror structured according to the parameters of FIG. 4*a* exhibited a center wavelength at 755 nm and comprised 200 oscillation cycles. The oscillations were gradually increased and decreased over 15 cycles each to reduce side-band structure. The average index of the filter was 2.0 and the index excursion ($n_{pv}$) was 0.04. The silica substrate had an index of 1.52 and the two coating materials ($SiO_2$ and $TiO_2$) had indices of 1.35 and 2.2. Quintic apodization coatings of $SiO_2$ and $TiO_2$ were used at the film-substrate and film-air interfaces to reduce broadband Fresnel reflection losses out-of-band.

The invention therefore provides a high performance wavelength stabilizing laser mirror/output coupler. It is understood that modifications to the invention may be made as might occur to one with skill in the field of the invention, within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A high performance wavelength stabilizing laser mirror/output coupler device for stabilizing a laser cavity within a narrow bandwidth, which comprises:

(a) a substrate of selected optical material;

(b) a coating of optical material deposited to a preselected thickness on said substrate; and (c) wherein said coating has a refractive index profile over said thickness thereof which is selectively continuously modulated between preselected high and low values to define a preselected narrow reflectance spectrum for said coating.

2. The device of claim 1 wherein said substrate comprises an optical material selected from the group consisting of fused silica, silicon and zinc selenide.

3. The device of claim 1 wherein said optical coating comprises an optical material selected from the group consisting of silicon dioxide, titanium dioxide, magnesium fluoride, thorium fluoride, zinc selenide and zinc sulfide.

4. The device of claim 1 wherein said refractive index profile of said optical coating is in the form of a sine wave, and said coating has an optical thickness of about 20 to 50 microns or about 50 to 250 cycles of said sine wave.

* * * * *